Feb. 23, 1965
C. H. WINFREE
ROTATABLE MOUNTING STRUCTURE WITH
MECHANICAL LOCKING BLIND BOLT
Filed Jan. 11, 1963
3,170,738
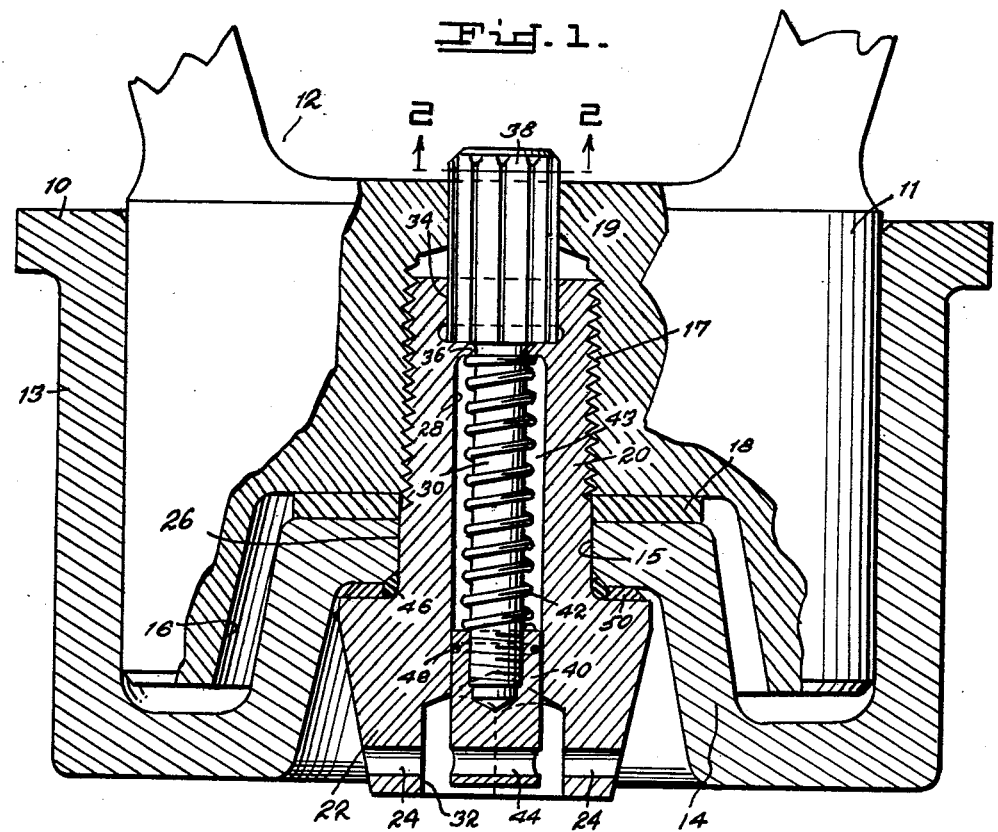
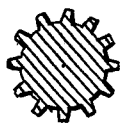
INVENTOR:
Clarence H. Winfree
BY
S. J. Rotondi, A. J. Dupont & E. P. Barthel United States Patent Office 3,170,738
Patented Feb. 23, 1965

3,170,738
ROTATABLE MOUNTING STRUCTURE WITH MECHANICAL LOCKING BLIND BOLT
Clarence H. Winfree, Warren, Mich., assignor to the United States of America as represented by the Secretary of the Army
Filed Jan. 11, 1963, Ser. No. 250,959
1 Claim. (Cl. 308—135)
(Granted under Title 35, U.S. Code (1952), sec. 266)

The invention described herein may be manufactured and used by or for the Government for governmental purposes without the payment of any royalty thereon.

The present invention relates to a gun mount and more particularly to a fastening device for mounting a gun in an armored structure. It is necessary to have a single fastener that is able to fixably position the gun in relation to the structure, yet provide for rotational movement between the members. Occasions sometimes arise when it is desired to remove the gun from the armored device and mount it on emergency tripods or other supports. The release of a simple locking plunger and its associated bolt permits instant withdrawal of the gun from the cradle. The gun may be quickly mounted on a tripod by placing its pintle in a supporting socket on a tripod. Thus, a machine gun or similar type weapon may be expeditiously employed alternately in the instant mount or on an emergency tripod without the use of any additional special fittings. There results a saving in time and material and an increased efficiency from a military standpoint.

An object of the invention is to provide a mount which will detachably support a gun for conjoint movement in an armored device.

Another object of the invention is to provide a mounting which will permit a quick removal of a gun therefrom and allow its immediate use on an emergency tripod or other support.

Still another objective of the invention is to provide a self-locking blind fastening device that automatically locks the gun to the mount.

Further objects of the invention are to simplify and improve the construction of this class of devices, so that they are inexpensive to manufacture, easy to apply and remove without scarring the threaded portion of the device, and consist of few parts, so that derangement is reduced to a minimum.

The specific nature of the invention as well as other objects and advantages thereof will clearly appear from a description of a preferred embodiment as shown in the accompanying drawing in which:

FIG. 1 is a cross section of the bolt showing the pintle in partial section.

FIG. 2 is a transverse section on line 2—2 of FIG. 1 showing the splined shaft of the plunger.

Referring to FIG. 1, there is shown a portion of the cradle 10 that has a socket-like adapter seat 13 formed therein. The circular pintle 11, having an upper gun supporting portion 12, is received in the socket 13 and locked thereto in a manner which will now be described. The socket 13 has a boss 14 provided with a concentric circular opening 15. The pintle 11 has a circular recess 16 shaped to conform to the boss 14. Screw-threaded bore 17 is centered in recess 16 so that it is automatically aligned with the opening 15 when the pintle is placed in the supporting socket. A washer 18 is placed on the boss 14 to seat the pintle for rotational movement. The bore 17 has a reduced diameter opening to form an internal splined fitting 19 complemental to the external spline shown in FIG. 2.

The standard bolt 20 has a cone head 22 with aligned passages 24 to receive a locking pin such as a cotter pin, for example. The bolt threadably engages the bore 17 thereby fastening the pintle to the cradle. The head of the bolt is spaced from the threaded portion by an unthreaded shank portion 26 that is in rotatable relation with the opening 15. The standard bolt is modified by providing an axial bore 28 for receiving a locking plunger 30. The bore 28 extends axially through the bolt to the hexagonal socket 32 in the head of the bolt which is formed for the reception of a standard hex key wrench. The bore 28 has internal spline fittings 34 at the opposite end from the head of the bolt that can be aligned to match the internal splines 19 of the pintle. The bore has a reduced neck 36 separating the splined region 34 from the remainder of the smooth bore 28 to control the travel of the plunger.

The locking plunger 30 has an external spline shaft 38 that is complemental to the internal splines 19 and 34 and protrudes from the threaded end of the bolt when the plunger is in bore 28. The plunger 30 is provided with a threadably removable retaining cap 40 which when removed allows for the reception of helical spring 42 around the central portion 43 of the plunger. The diameter of the cap is such that it will slide in the bore 28 while the smaller diameter of the central portion of the plunger allows it to travel through the reduced neck portion 36. The spring encircles the central portion of the plunger while its upper limit abuts the underside of the reduced neck 36 and its lower limit abuts the cap 40 to urge the cap to occupy the socket 32. The axial depth of the socket is greater than the axial distance from the upper surface of the reduced neck 36 to the threaded end of the bolt to provide sufficient travel for disengagement of the plunger splines from the bolt. The cap has a passage 44 which can be aligned with the passage 24 of the bolt to receive a locking pin (not shown). An O-ring 46 is shown inserted betwen the bolt head and the boss to form a dirt seal. A second O-ring seal 48 can be placed around the plunger cap to seal the bore 28 if desired. Washed 50 is inserted between the underside of the bolt head and the boss to insure a close fit.

In operation, the bolt is arranged in the position shown in FIG. 1 with the spline shaft of the locking plunger engaging both the internal splines 19 and 34 whereby rotary movement of the bolt relative to the pintle is prevented. It will be understood that the spring 42 operates or urges the plunger into the socket 32 at all times. Whenever it is necessary to remove the pintle 11, the plunger must be forced upwardly until the splined end 38 is clear of the corresponding splines 34 of the bolt, after which the bolt can be unscrewed and removed.

In order to properly manipulate the bolt for attachment or removal, a standard hex head key wrench is employed. When the wrench is inserted in the socket 32 of the bolt, the plunger is moved upwardly. As the depth of the socket is equal to or greater than the axial length of the splines 34, the insertion of the wrench disengages the splines 38 from the splines 34. Thereafter rotation of the wrench will disengage the bolt from the pintle while withdrawing the splines 38 from the pintle 11.

To secure the pintle, a hex wrench is used to rotate the bolt until the plunger engages the splines 19. Continued rotation moves the splines 19 and 38 into engagement while bringing the bolt head 22 into engagement with the boss 14. As the hex wrench is withdrawn from the socket 32, the plunger will automatically follow under action of the spring 42 causing the splines 38 to engage the splines 34. It may be necessary to back the bolt off approximately 1/12 turn to allow the splines to align themselves and provide a snug fit for the bolt when it is screwed up tightly. However, by providing a sufficient number of spline keys, as shown in FIG. 2, the amount of adjustment is slight to attain the necessary alignment.

The head of bolt 20 is cone shaped to provide clearance between the head and the boss 14 to allow for insertion of a locking pin, if desired, to further lock the bolt.

It is understood that various modifications may be apparent to those skilled in the art without departing from the spirit and scope of the invention, and the invention is not to be limited to the illustrated embodiments except as included in the appended claim.

I claim:

In a separable pivotal mounting structure for securing in journal-thrust bearing relationship first and second rotatable members, each of which has a registering opening therein comprising a socket member having an upwardly opening cup-shaped race chamber therein, said race chamber having a raised concentric boss portion providing a first planar thrust bearing surface having a centrally located opening therethrough, a journal shaft member rotatably positioned within said race chamber, said shaft member having a downwardly opening circular recess in its end portion receiving said raised boss and providing a second planar thrust bearing surface for seating on said first bearing surface, a standard bolt member having a threaded end portion, a central smooth shank portion and an enlarged cone shaped head; the base portion of said cone shaped head located adjacent to said smooth shank forming a horizontal shelf for seating within said boss, said conical head configuration permitting entry of a locking pin through a horizontal passageway in said head, said bolt extending upwardly through the opening in said boss with said shank portion in rotatable journal contact with the boss opening, said shaft member having a concentric threaded bore for engaging the threaded end of said bolt, an axial bore extending through said bolt, locking means slidably received within said axial bore, said locking means in the form of an axially displaceable plunger having a locking end protruding from the threaded end of said bolt and a retainer cap at the opposite end connected to said locking end by an intermediate pin portion, said pin portion having a reduced diameter from that of the axial bore, said axial bore having a reduced diameter neck portion that separates an internal gear-tooth type spline fitting from the remaining portion of the axial bore, said locking end of said plunger provided with external splines complemental to said internal splines of said bolt, the threaded bore of said shaft having an internal spline portion at its inner end for engaging and locking said external spline to said shaft member in non-rotatable relation therewith, said bolt having a hexagonal socket in its head providing an internal hex head wrench engaging portion, a coil spring encircling said central pin portion of said plunger with its upper limit abutting the underside of said reduced neck and its lower limit abutting and urging said cap into the hexagonal socket, said plunger cap having a horizontal passageway located so that when said plunger is in its biased position in the hexagonal socket it is in alignment with the horizontal passageway of said bolt head to permit a locking pin to lock said plunger against axial movement with respect to said bolt, and hex head wrench means insertable in the hexagonal socket producing axial movement of said plunger resulting in said external splines thereof being moved axially out of engagement with said bolt splines permitting said bolt to be unthreaded from said shaft.

References Cited by the Examiner

UNITED STATES PATENTS

| | | | |
|---|---|---|---|
| 913,712 | 3/09 | Dyer | 151—8 |
| 2,318,590 | 5/43 | Boynton | 151—8 |
| 2,369,397 | 2/45 | Johnson | 151—8 |

FOREIGN PATENTS 706,271   3/54   Great Britain.

EDWARD C. ALLEN, *Primary Examiner.*